United States Patent
Yokawa (10) Patent No.: US 7,495,897 B2
(45) Date of Patent: Feb. 24, 2009

(54) PANEL DISPLAY AND DISPLAY

(75) Inventor: Akira Yokawa, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 12/005,294

(22) Filed: Dec. 26, 2007

(65) Prior Publication Data
US 2008/0156954 A1  Jul. 3, 2008

(51) Int. Cl.
*G06F 1/16* (2006.01)
(52) U.S. Cl. ............... 361/681; 312/223.1; 248/918
(58) Field of Classification Search ......... 361/679–686, 361/724–727; 248/917–924
See application file for complete search history.

(56) References Cited

U.S. PATENT DOCUMENTS

2005/0157457 A1 * 7/2005 Kim ................ 361/681

2006/0001782 A1 * 1/2006 Kato ................ 348/794

FOREIGN PATENT DOCUMENTS

| JP | 11-219127 | 8/1999 |
| JP | 2001-236024 | 8/2001 |
| JP | 2006-154842 | 6/2006 |

* cited by examiner

*Primary Examiner*—Jayprakash N Gandhi
*Assistant Examiner*—Nidhi Desai
(74) *Attorney, Agent, or Firm*—Yokoi & Co., U.S.A., Inc.; Peter Ganjian (57) ABSTRACT

The present invention discloses a display comprising: a stand including a base and a post; a lower part of a display unit having a fixing part for fastening the post to the lower part; the stand supporting the display unit with the post fastened to the fixing part extending upward; the base of the stand is provided with a first through hole used for fastening the base to a wall; the post of the stand is provided with a second through hole used for fastening the post to the display unit; a back wall of the display unit includes a depressed part; the depressed part is provided with a threaded hole used for fastening the post to the display unit; and the stand supporting the display unit with the base fastened to the wall and the post fastened to the depressed part.

7 Claims, 8 Drawing Sheets

PANEL DISPLAY AND DISPLAY

CROSS-REFERENCES TO RELATED APPLICATIONS

The present application is related to the Japanese Patent Application No. 2006-355789, filed on Dec. 28, 2006, the entire disclosure of which is expressly incorporated by reference herein.

BACKGROUND OF THE INVENTION

1. Field of the Invention

The present invention relates to a panel display capable of being mounted on a wall and a display.

2. Description of the Related Art

A known structure disclosed in Japanese Unexamined Patent Application Publication (JP-A) No. 2001-236024 includes a tilt unit attached to the back wall of a display unit, and a stand fastened to the tilt unit with screws. The stand is separated from the tilt unit by unscrewing the screws, the stand is turned through an angle of 90°, the stand is fastened again to the tilt unit with the screws, and then the stand is fastened to a wall with its bottom surface set parallel to the surface of the wall to dispose the display unit parallel to the surface of the wall.

A known structure disclosed in JP-A-2006-154842 includes a base bracket provided with holding projections and a monitor having a base provided with recesses. The base bracket is fastened to a wall with bolts, and then the monitor is put on the base bracket with the holding projections of the base bracket engaged into the recesses of the base to mount the monitor on the wall.

A structure disclosed in JP-A-H11-219127 includes a liquid crystal display unit, a stand, and a support member having opposite connecting ends connected to the display unit and the stand, respectively. The display unit and the stand are turned so that the display unit, the stand and the support member may be contained in a plane, and the structure is mounted on a wall.

Conventionally, a wall display, such as a wall liquid crystal display, is provided in its back case with a mounting structure conforming to VESA (Video Electronics Standards Association) standards. The user buys a mounting fixture for mounting the wall display on a wall. The mounting fixture is connected to the mounting structure from behind and the mounting fixture is fastened to a wall to hold the wall display on the wall.

Those known structures disclosed in the patent documents for mounting a display on a wall have the following problems.

The structure disclosed in the JP-A-2001-236024 holds the display unit on the wall by the tilt unit protruding from a lower part of the back wall of the display unit and the stand. Those members necessary for holding the display unit on the wall are heavy. Since the stand is connected to the tilt unit protruding backward from the back wall of the display unit, the distance between the display unit and the wall is long. Consequently, it is difficult to securely hold the display unit in a space apart from the wall and it is dangerous to hold the display unit in such a state. As obvious from FIG. 7 of JP-A-2001-236024, the stand is visible from the front side of the display unit mounted on the wall, which is aesthetically undesirable.

The monitor mentioned in JP-A-2006-154842 needs an additional member, namely, the base bracket to be mounted on the wall, which requires an additional monetary cost.

The liquid crystal display unit mentioned in patent document is mounted together with the stand on the wall. Therefore, the stand is visible when the liquid crystal display unit mounted on the wall is used, which is aesthetically undesirable. Since the back wall of the liquid crystal display unit is in close contact with the wall, the wall obstructs heat dissipation through the back wall of the liquid crystal display unit.

A method of mounting a display unit by the mounting structure and the mounting fixture requires buying the mounting fixture and providing the display with the mounting structure necessary only for mounting the display unit on a wall. Thus such a display is expensive. Bosses need to be formed beforehand on the display and screws are necessary to hold the mounting structure fixedly in the case of the display, leading to high production costs. The mounting structure needs to be disposed apart from electronic wiring boards disposed inside the case to avoid the adverse electrical influence of the mounting structure on the electronic wiring boards. Consequently, it is difficult to determine the layout of electronic devices in the case and to determine the sizes of the electronic devices, which enhances the degree of difficulty in manufacturing the display and increases the manufacturing cost of the display. Under the recent circumstances requiring reducing the thickness of the display, it is scarcely possible to space the mounting structure apart from the inside surface of the back wall of the case when the mounting structure is disposed in the case. Therefore, minute vibrations of the mounting structure will cause the case to vibrate and generate noise.

BRIEF SUMMARY OF THE INVENTION

The present invention discloses to provide a panel display and a display capable of being highly safely mounted on a wall without spoiling appearance, of being manufactured at a low cost, and of eliminating disadvantages resulting from the providing the display with the mounting structure necessary only for mounting the display on a wall.

One aspect of the present invention provides a display capable of being mounted on a wall, the display comprising:
 a display unit;
 a stand supporting the display unit;
 the stand including a base and a post extending from the base;
 a lower part of the display unit having a fixing part for fastening the post to the lower part;
 the stand supporting the display unit with the post fastened to the fixing part extending upward;
 the base of the stand is provided with a first through hole used for fastening the base to the wall;
 the post of the stand is provided with a second through hole used for fastening the post to the display unit;
 a back wall of the display unit includes a depressed part;
 the depressed part is provided with a threaded hole used for fastening the post to the display unit; and
 the stand supporting the display unit with the base fastened to the wall and the post fastened to the depressed part.

An optional aspect of the present invention provides the display wherein a number of the first through holes formed in the base on a rear side of the display unit is greater than a number of the first through holes formed in the base on a front side of the display unit with the fixing part of the display unit fastened to the post.

When the display is in the normal position for use, the through holes formed in the base of the stand are not used and it is preferable that the through holes are not visible to the user from the aesthetic viewpoint of the appearance of the display.

Therefore, a greater number of the through holes may be formed in a rear part of the base on the rear side of the display unit supported on the post with the fixing part thereof fastened to the post. Thus the number of the screws visible to the user can be reduced when the display is set in the normal position for use and the aesthetic appearance of the display will not be spoiled.

Another optional aspect of the present invention provides the display wherein the first through hole is formed at positions under a bottom wall of the display unit at least in a range on the front side of the display unit when the post is fastened to the fixing part.

The through holes of the base may be formed in parts corresponding to the bottom wall of the display unit and on the front side of the display unit at least when the post and the fixing part are fastened together. The through holes formed in the parts of the base on the front side of the display unit are under the bottom wall of the display unit. Therefore, the through holes are not conspicuous and do not spoil the aesthetic appearance of the display.

Another optional aspect of the present invention provides the display wherein the stand includes a sheet metal core member and serving as cores of the base and the post, and a covering member covering the sheet metal core member, and the first through hole is formed only in the sheet metal core member.

The stand includes a sheet metal core member formed by processing a sheet metal and serving as cores of the base and the post, and a covering member covering the sheet metal core member. The through holes may be formed only in the sheet metal core member. When the through holes are formed only in the sheet metal core member, the through holes formed in the base can be completely concealed by the covering member covering the sheet metal core member in a state where the display is set in the normal position for use. The display can be mounted on a wall by removing the covering member and fastening the base with screws passed through the through holes formed in a base part of the sheet metal core member.

Another optional aspect of the present invention provides the display wherein the post has a flat part provided with the second through hole, and rail formed by bending opposite side parts of the flat part substantially perpendicularly to the flat part; and the depressed part is provided with grooves, in which the rail engages, formed in a surface of the back wall provided with a threaded hole to guide the post into a depth of the depressed part.

The post has a flat part provided with post's through holes, and rails rising substantially perpendicularly to the flat part from the opposite side edges of the flat part. The depressed part may be provided with grooves, in which the rails engage, formed in a back wall provided on its back surface with internally threaded parts to guide the post into the depth of the depressed part. The post is fastened to the depressed part by fitting the post deep into the depressed part with the rail parts engaged in the grooves and fastening the post to the back wall with screws passed through the post's through holes formed in the post and screwed in the internally threaded parts of the back wall. Thus the post can be fastened to the back wall with screws passed through the through holes of the post and those of the back wall with the post fitted deep in the depressed part and the rail parts engaged in the grooves. Therefore, the display unit thus securely supported in the air facilitates fastening work.

Another optional aspect of the present invention provides the display wherein the base has an outline within a region surrounded by the outline of the back wall of the display unit in a state where the post is fastened to the depressed part.

The base has an outline within a region surrounded by the outline of the display unit when the post is fastened to the depressed part. When the base is thus formed, the base of the stand is concealed entirely by the display unit when the display unit is mounted on a wall. Therefore, stand is not visible to the user on the front side of the display unit and hence the display mounted on a wall has an aesthetically satisfactory appearance.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as description of presently preferred embodiments of the invention and is not intended to represent the only forms in which the present invention may be constructed and or utilized.

A preferred embodiment of the present invention will be described with reference to the accompanying drawings.

Another aspect of the present invention provides a panel display 10 capable of being mounted on a wall W, the panel display 10 comprising:

a display unit 20 formed by housing a display panel 20a in a case 20b;

a stand 30 supporting the display unit 20;

the stand 30 having a base 32 having a substantially elliptic outline, and a post 31 extending from a substantially central part of the base 32 substantially perpendicularly to the base 32;

the post 31 having a flat part 31a3 substantially parallel to the display panel 20a, and rails 31a2 formed by bending opposite side edge parts substantially perpendicularly to the flat part 31a3;

the stand 30 formed by covering a sheet metal core member 31a,32a for the base 32 and the post 31 with a resin covering member 31b,32b;

a lower part of the display unit 20 provided with a fixing part 24 to which the post 31 inserted into the case 20b is fastened;

the fixing part 24 having a part facing the flat part 31a3 of the post 31 inserted into the case 20b and capable of engaging with first screws 50;

the flat part 31a3 of the post 31 is provided plural post's through holes (second through holes) 31a1 through which the first screws 50 are passed and engaged with the fixing part 24 to fasten the flat part 31a3 to the display unit 20;

the stand 30 supports the display unit 20 with the post 31 fastened to the fixing part 24 extending upward;

the case 20b having a back wall 21 comprising a depressed part 25 with a vertical center axis aligned with a vertical line passing a substantially central part of the back wall 21, and opening backward and downward;

the depressed part 25 having at least a down-facing surface 25a provided with grooves 25a1 in which the rails 31a2 engage, for guiding the post 31 into a depth of the depressed part 25;

the down-facing surface 25a of the depressed part 25 is provided with internally threaded bosses 25a2 formed at positions respectively coinciding with the post's through holes 31a1 and capable of engaging with second screws 40 passed through the post's through holes 31a1;

the base 32 of the stand 30 is provided with plural base's through holes (first through holes) 33 through which third screws 60 are passed to fasten the base 32 to the wall W;

the stand 30 supporting the display unit 20 with the base 32 and the post 31 fastened to the wall W and the depressed part 25, respectively; and the base 32 having an outline within a region surrounded by an outline of the back wall 21 of the display unit 20.

Figure 1:
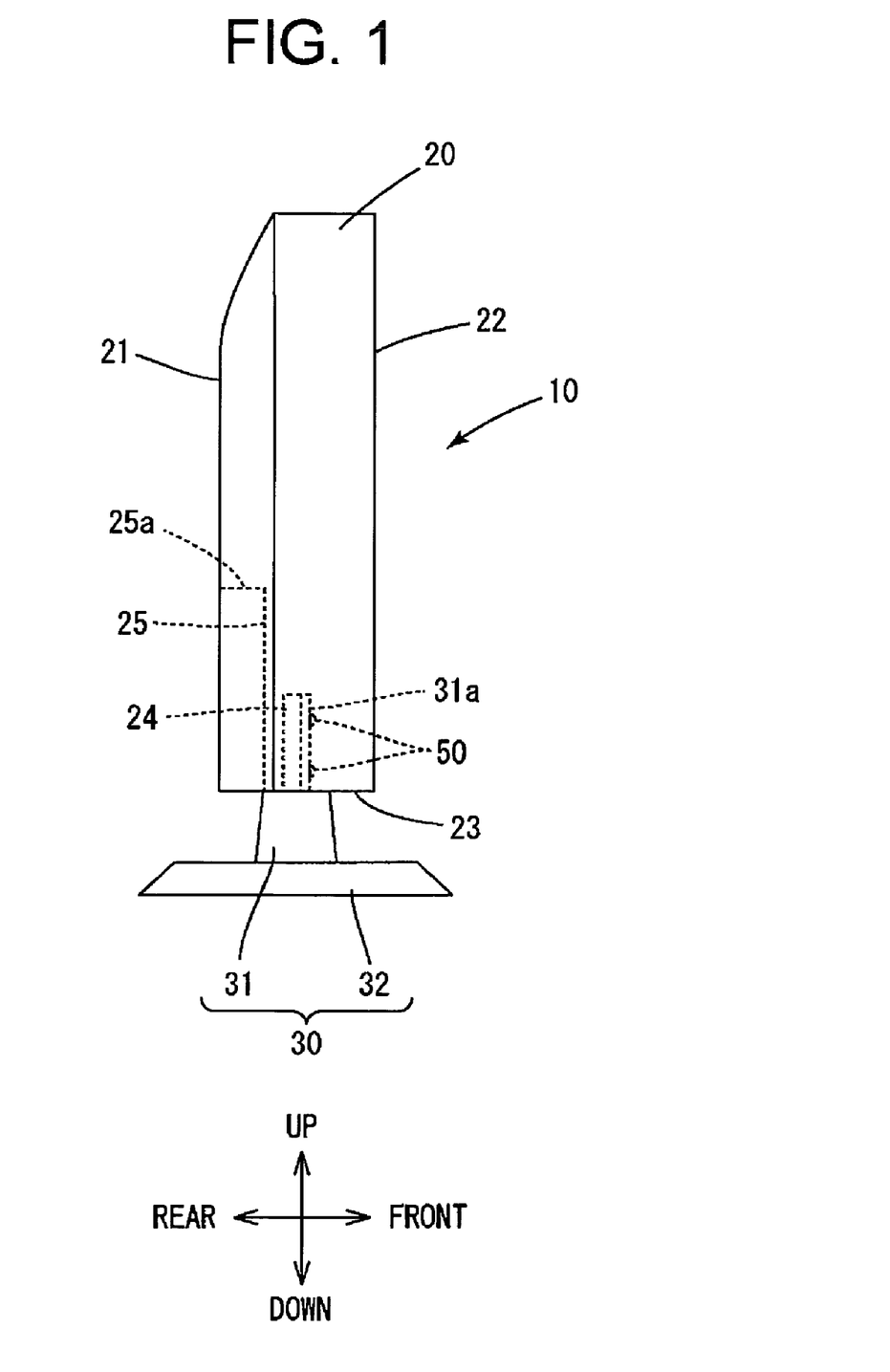
FIG. 1 is an exemplary illustration of a side view of a display in a normal position for use.
Figure 7:
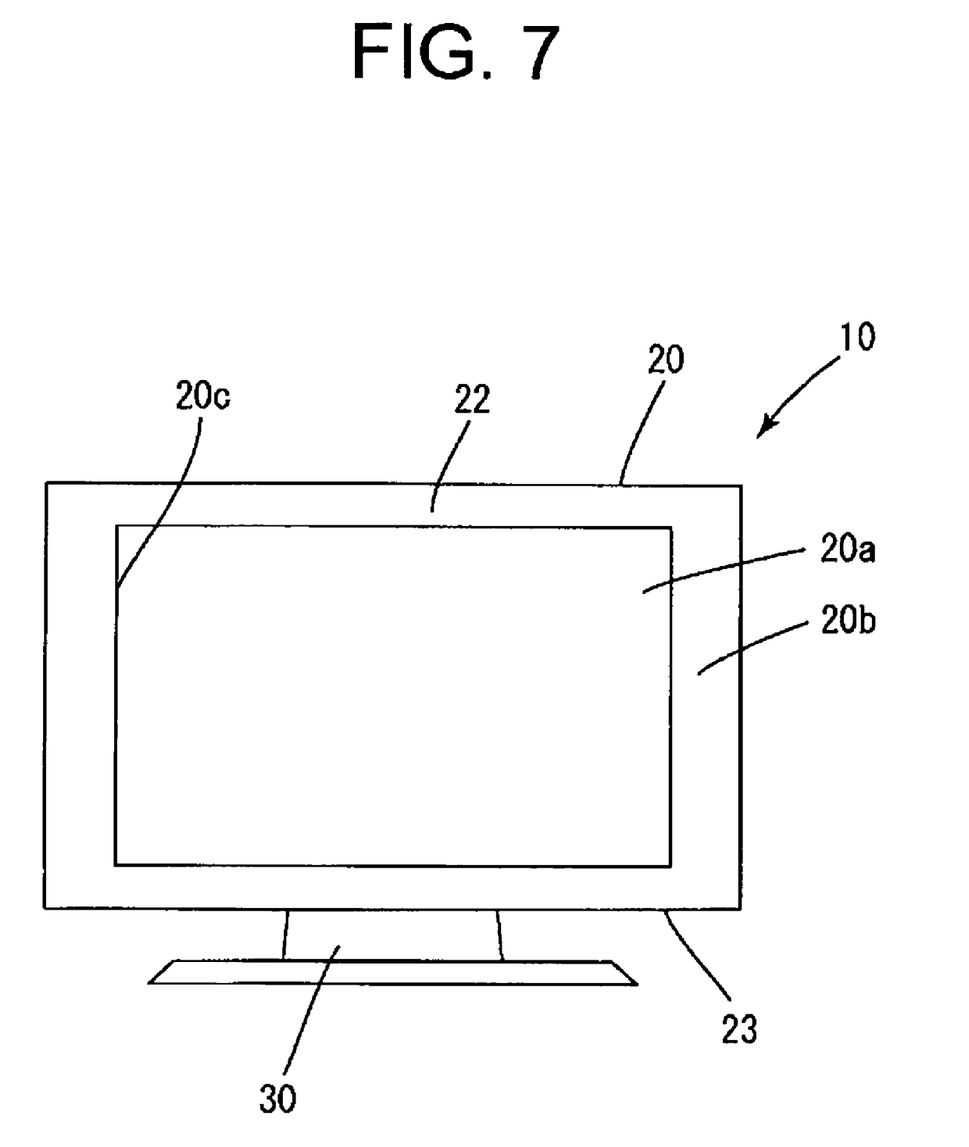
FIG. 7 is an exemplary illustration of a front view of a display in a normal position for use.
Figure 8:
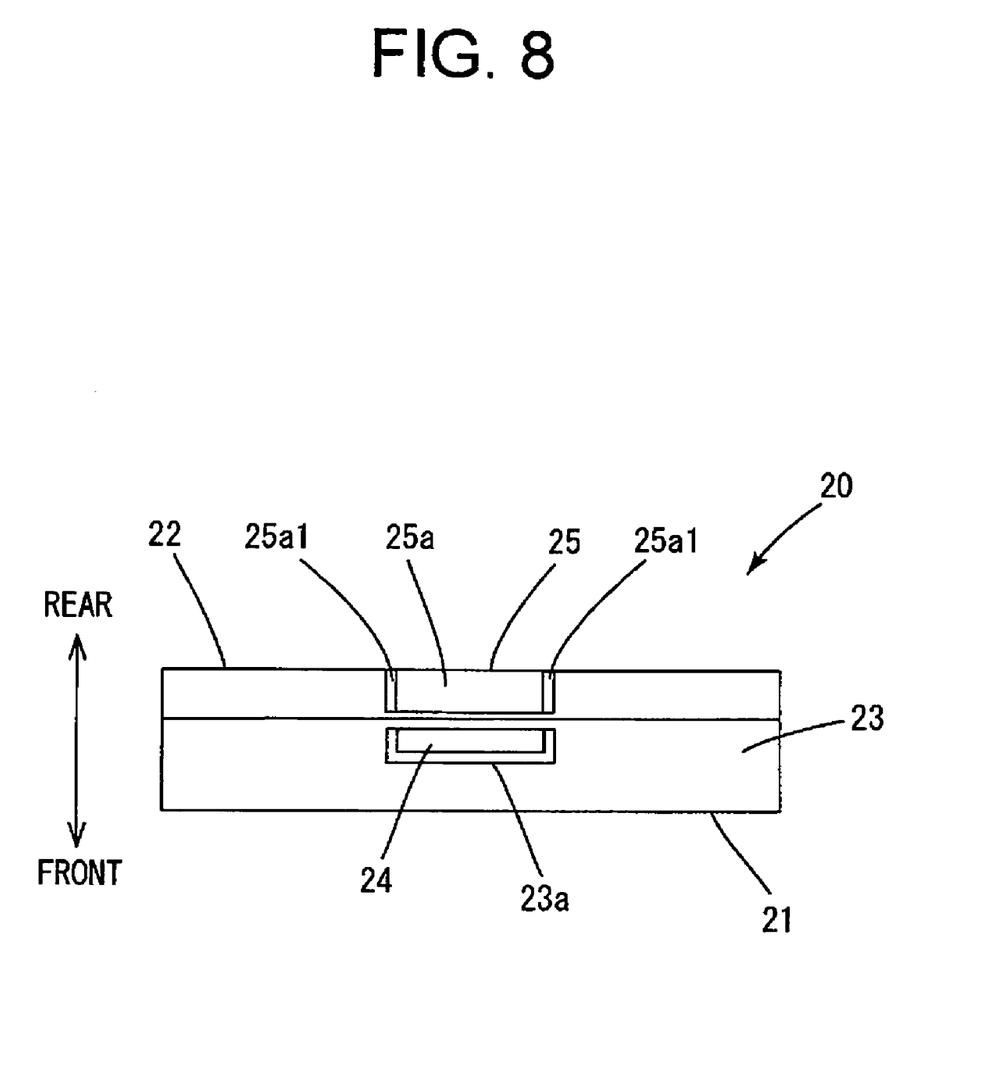
FIG. 8 is an exemplary illustration of a bottom view of a display unit.

FIG. 1 is a side view of a display 10 in a normal position for use. FIG. 7 is a front view of a display 10 in a normal position for use. FIG. 8 is a bottom view of a display unit 20. The display 10 is a panel display including, as a principal components, a display unit 20 and a stand 30.

The display unit 20 is formed by housing a display panel 20a, such as a liquid display panel or a plasma display panel, in a case 20b made of a resin. The display unit 20 has a display panel 20a exposed outside through a substantially rectangular opening 20c formed in the front wall 22 of the case.

The stand 30 has a base 32 and a post 31 substantially vertically extending from a substantially central part of the base 32. In the normal position for use, the base 32 is placed on a desired place, such as a floor or a desk, and the post 31 is fastened to a part of the display unit 20 near the lower wall 23 of the display unit 20 to set the display unit 20 in an upright position.

A support part 31a formed from a plate of the post 31 is inserted through an opening 23a formed in the lower wall 23 into the case of the display unit 20, and the support part 31a is fastened to a fixing part 24 of the display unit 20 facing the support part 31a with first screws 50 to support the display unit 20 on the post 30 in the normal position for use.

Figure 2:
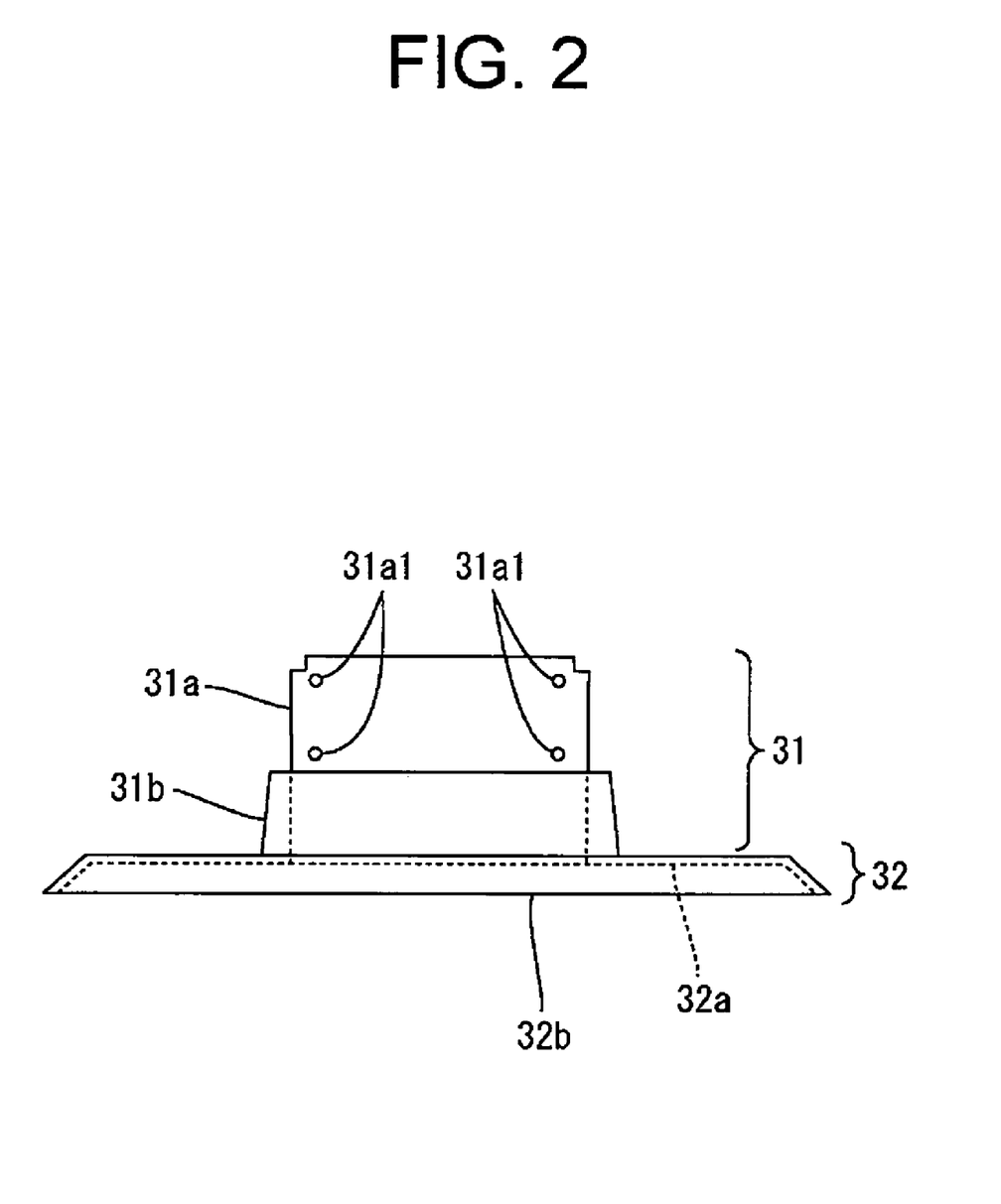
FIG. 2 is an exemplary illustration of a front view of a stand.
Figure 3:
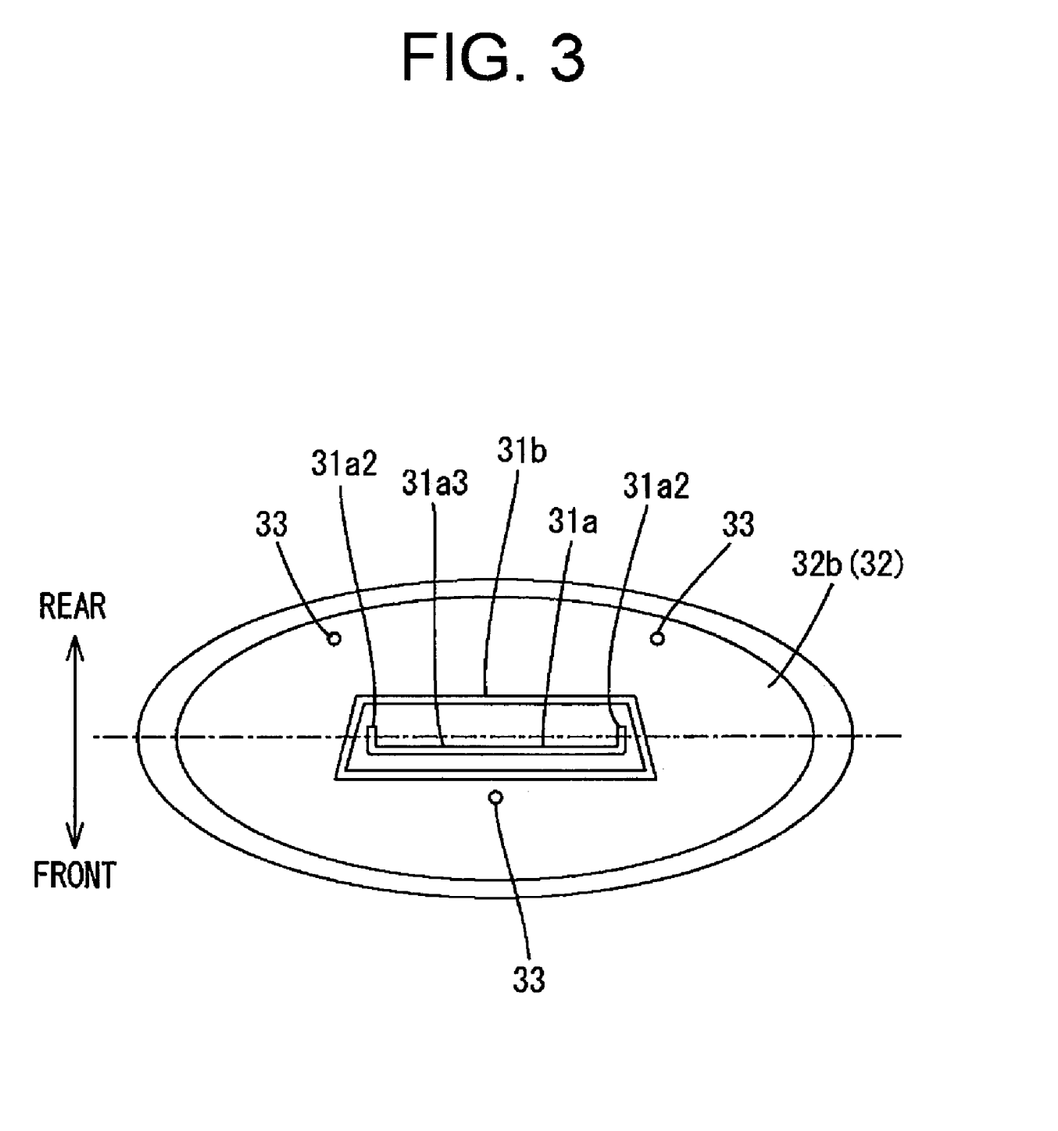
FIG. 3 is an exemplary illustration of a top view of the stand.

FIG. 2 is a front view of the stand 30 taken from the front side of the display 10. FIG. 3 is a top view of the stand 30. The stand 30 is provided with a sheet metal core member formed by processing a sheet metal and serving as a core for the base 32 and the post 31, and a resin cover covering the sheet metal core member. The sheet metal core member has a base part 32a extending in the base 32, and a support part 31a extending in the post 31. The resin cover has a base covering part 32b covering the base part 32a from above, and a post covering part 31b covering a predetermined root part of the support part 31a. In other words, the base 32 includes the base part 32a and the base covering part 32b, and the post 31 includes the support part 31a and the post covering part 31b.

As shown in FIG. 2, the support part 31a of the post 31 is provided with plural second through holes 31a1, namely, post's through holes, for receiving screws. In this embodiment, the support part 31a is fastened to the fixing part 24 of the display unit 20 with screws passed through the through holes 31a1 to set the display 10 in the normal position for use. In the normal position for use, a flat part 31a3 of the support part 31a is substantially parallel to the display panel of the display unit 20. The through holes 31a1 are used also for fastens the stand 30 and the display unit 20 together when the display 10 is mounted on a wall.

Referring to FIG. 3, the support part 31a of the post 31 has the flat part 31a3, and rails 31a2 formed by bending opposite side parts of the flat part 31a3 substantially perpendicularly to the flat part 31a3. The through holes 31a1 are formed in the flat part 31a3.

The base 32 is provided with plural first through holes 33, namely, base's through holes. The through holes 33 are used for fixing the stand 30 to a wall with third screws 60 when the display 10 is mounted on the wall. The through holes 33 are arranged around the post 31.

The respective numbers of the through holes 31a1 and 33 are not limited. The number of the through holes 33 formed in a rear region on the back side of the display unit 20 is greater than that of the through holes 33 formed in a front region on the front side of the display unit 20, when the display 10 is set in the normal position for use.

The surface of the front part of the base 32 is visible to the user when the display 10 is set in the normal position for use. Therefore, a less number of through holes are formed in the front part of the base 32 to improve the aesthetic appearance of the display 10.

In this embodiment, the through holes 33 are formed in a region of the front part of the base 32 under the lower wall 23 of the display unit 20 with respect to a vertical direction. That is, the through holes 33 formed at positions as near to the stand 31 as possible will not spoil the aesthetic appearance of the display 10 because those through holes 33 are concealed from view by the lower wall 23 of the display unit 20 and are not easily visible.

The through holes 33 may be formed only in the base part 32a of the sheet metal core member extending in the base 32 and not in the base covering part 32b. When the threaded holes 33 are formed only in the base part 32a, the through holes 33 are not visible at all and hence the aesthetic appearance of the display 10 is improved. To set the stand 30 fixedly on a wall by using the through holes, the resin cover may be removed from the sheet metal core member, and only the sheet metal core member may be fastened to the wall.

Although the outline of the base 32 shown in FIG. 3 is substantially elliptic, the outline of the base 32 is not limited thereto and may be of any desired shape.

Figure 4:
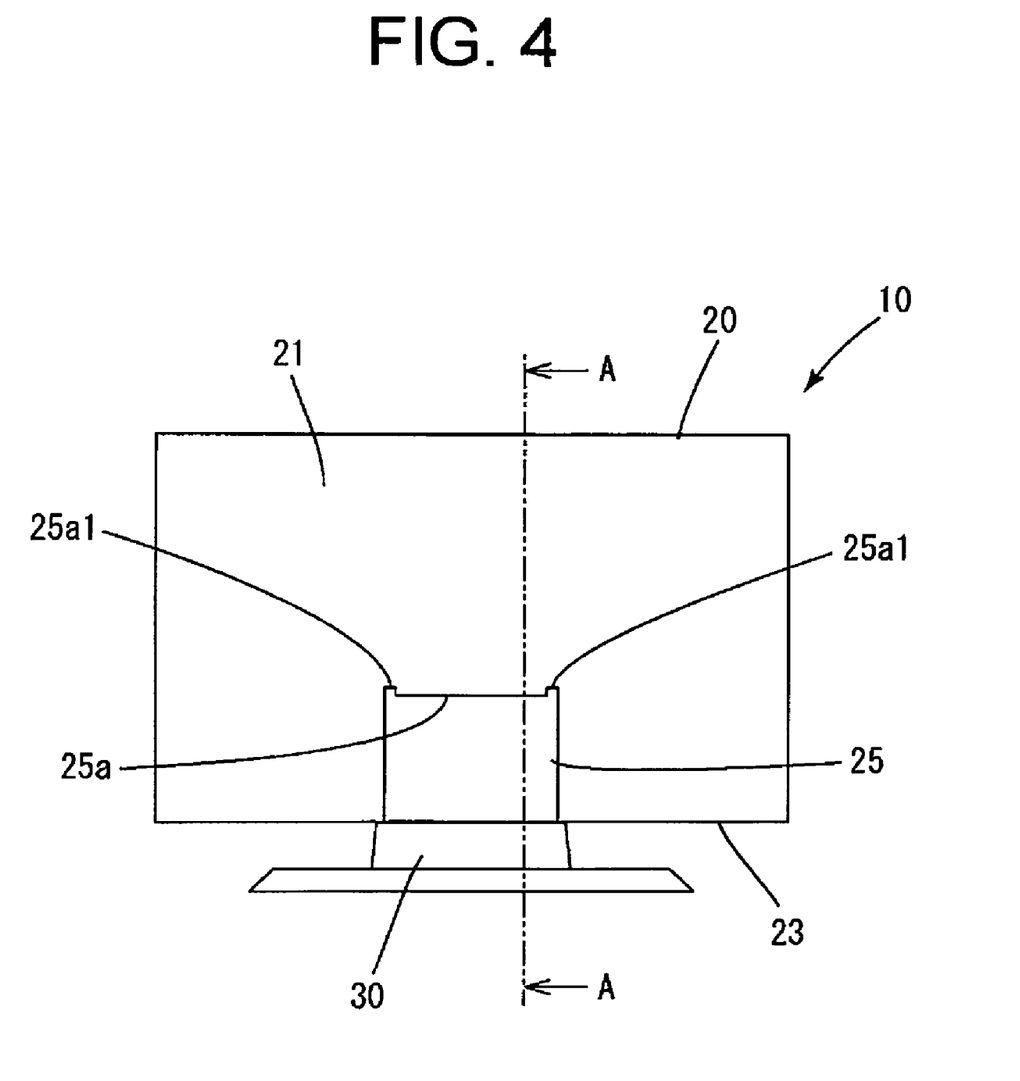
FIG. 4 is an exemplary illustration of a rear view of the display in the normal position for use.

FIG. 4 is a rear view of the display 10.

The case of the display unit 20 has a back wall 21 provided in its back surface with a substantially rectangular depressed part 25. The depressed par 25 is formed substantially on the vertical center line of the back wall 21 and opens rear ward and downward. The shape of the depressed part 25 is not limited to that shown in FIG. 4 and the depressed part 25 may be formed in any shape, provided that the depressed part 25 has a surface 25a (described later) to be joined to the stand 30.

A method of mounting the display 10 on a wall will be described.

Figure 5:
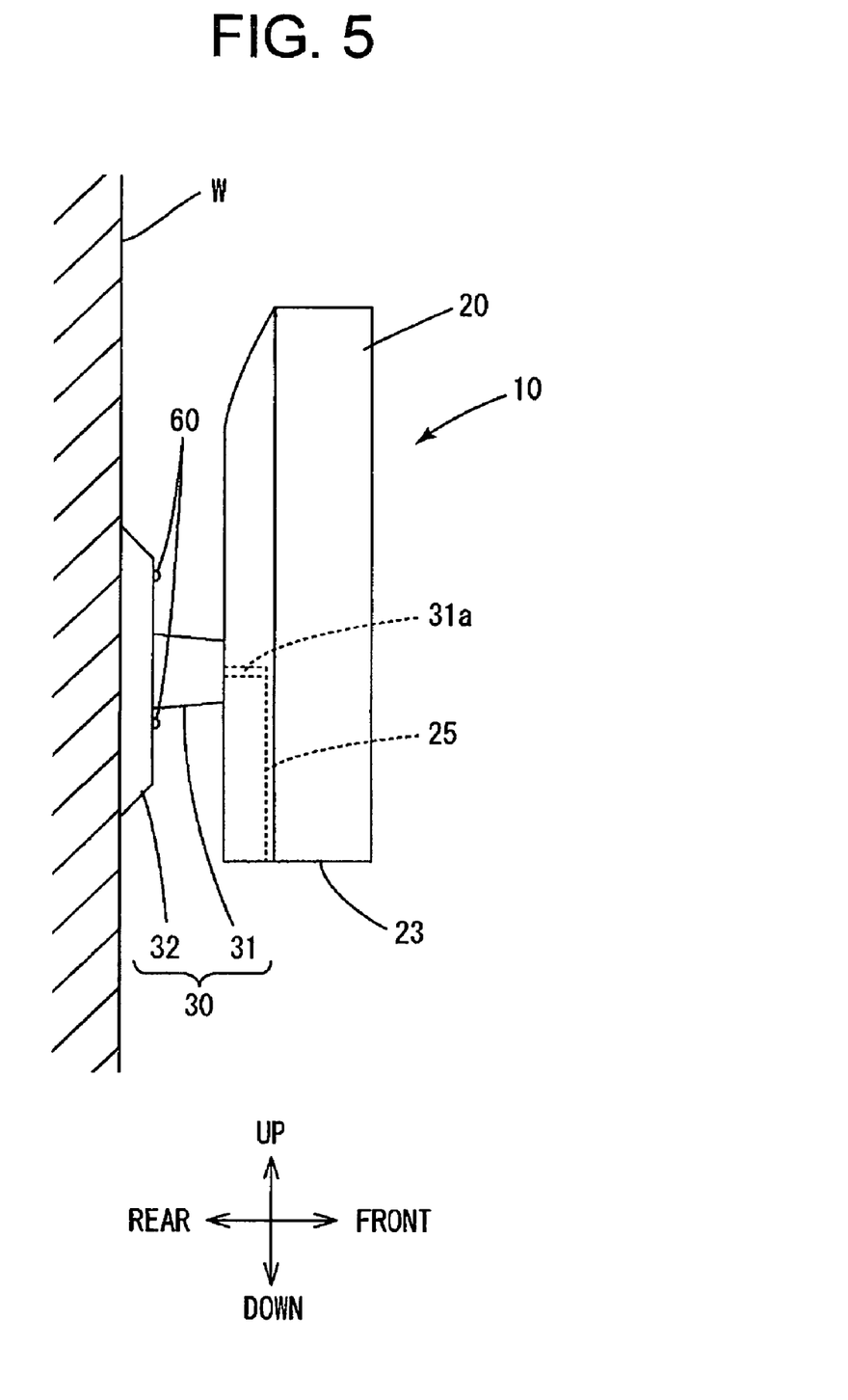
FIG. 5 is an exemplary illustration of a side view of the display mounted on a wall.

FIG. 5 is a side view of the display 10 mounted on a wall W. To mount the display 10 on the wall W, the stand 30 is separated from the lower wall 23, and the base 32 is fixed to the wall W. The base 32 is fixed to the wall W with screws passed through the through holes 33.

Then, the support part 31a of the post 31 extending from the wall W perpendicularly to the wall W is inserted in the depressed part 25. The flat part 31a3 of the support part 31a is fastened to a surface 25a facing down of the depressed part 25.

In this embodiment, grooves 25a1 are formed in the opposite ends of the surface 25a, respectively, as shown in FIG. 4. The grooves 25a1 extend continuously into the depth of the depressed part 25 in a direction from the back side toward the front side. The distance between the grooves 25a1 in the surface 25a is equal to the distance between the rails 31a2 at the opposite ends of the flat part 31a3. When the support part 31a is inserted into the depressed part 25, the rails 31a2 are fitted in the grooves 25a1, respectively, and the support part 31a is inserted into the depth of the depressed part 25. After the support part 31a has reached the bottom of the depressed part 25, the stand 31 is fastened to the display unit 20 by fastening the support part 31a to the surface 25a by screwing screws through the through holes 31a1 formed in the flat part 31a3 into internally threaded bosses 25a2, namely, back wall's threaded holes.

Since the post 31 and the display unit 20 are fastened together with the screws with the rails 31a2 of the post 31 engaged in the grooves 25a1 of the depressed part 25, the position of the display unit 20 is stabilized during fastening work for fastening together the stand 31 and the display unit 20, and the fastening work can be easily and safely accomplished.

Figure 6:
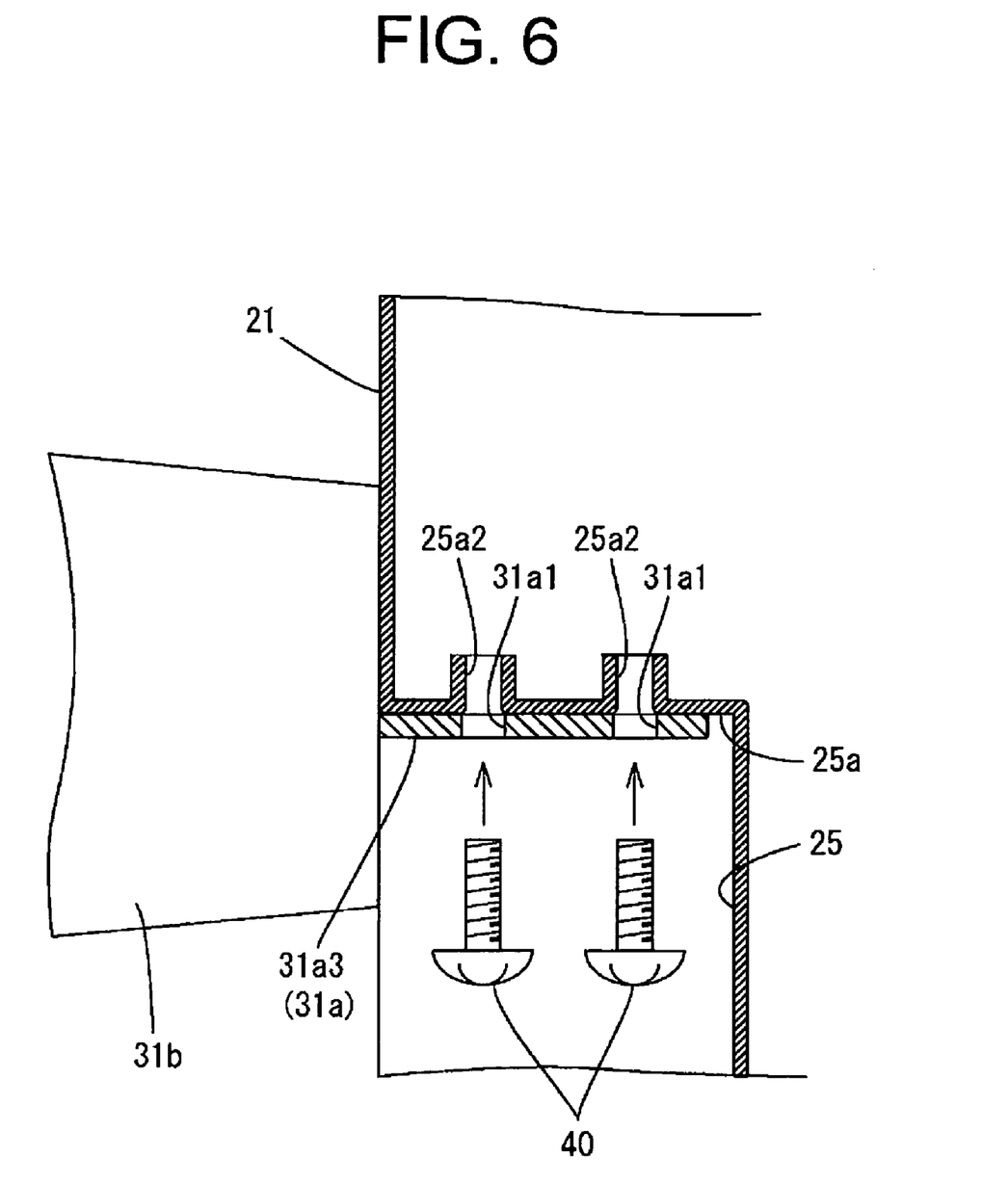
FIG. 6 is an exemplary illustration of a sectional view of assistance in explaining a method of fastening a post to a depressed part.

FIG. 6 is a sectional view illustrating fastening work for fastening the flat part 31a3 of the support part 31a of the sheet metal core member to the surface 25a with second screws 40. FIG. 6 is a sectional view, taken on the line A-A in FIG. 4, showing the relation between the support part 31a and the surface 25a. As shown in FIG. 6, the second screws 40 are screwed through the through holes 31a1 of the flat part 31a3 into the internally threaded bosses 25a2 formed in the surface 25a to fasten the flat part 31a3 to the surface 25a. Basically, the internally threaded bosses 25a2 are made of a resin, the internally threaded bosses 25a2 may be strong bosses made of a metal.

The stand 30 supporting the display unit 20 on the floor in the normal position for use is separated from the lower wall 23 of the display unit 20, the base 32 of the stand 30 is fastened to the wall W, the free end part, namely, the end part 31a, of the post 31 of the stand 30 is inserted into the depressed part 25 formed in the back wall 21 of the display unit 20, and the flat part 31a3 of the support part 31a is fastened to the surface 25a of the depressed part 25 to hold the display 10 on the wall W.

In other words, any other parts other than the display 10 do not need to be bought and the display 10 does not need to be provided beforehand with any mounting fixture to be used only for mounting the display 10 on the wall, and the display 10 can be mounted on the wall by the parts originally included in the display 10. Consequently, the display 10 requires less monetary cost necessary for mounting the same on the wall than the conventional ones.

Since the display 10 dos not need to be provided beforehand with any mounting fixture, difficulties in manufacturing and reducing the thickness of the display 10 resulting from providing the display 10 with a mounting fixture can be eliminated problems including vibration generation and cost increase can be solved.

According to the present invention, the post 31 of the stand 30 is inserted into and fastened to the depressed part 25 formed in the back wall 21 of the display unit 20. The display unit 20 is at a less distance from the wall W than the display unit of the conventional display, and hence the display unit 20 can be supported securely in the air.

According to the present invention, the base 32 of the stand 30 is invisible from the front side of the display 10 when the display 10 is mounted on the wall. As obvious from FIG. 5, the base 32 is formed in a size such that the outline of the base 32 is within a region surrounded by the outline of the back wall 21 when the post 31 is fastened to the depressed part 25. More concretely, when the surface 25a is below the center of the back wall 21, the distance between the surface 25a and the lower wall 23 is longer than half the size of the base 32 with respect to a vertical direction. In this state, the base 32 is invisible to the user on the front side of the display unit 20 of the display 10 mounted on the wall.

Another aspect of the present invention provides a display 10 comprising a display unit 20; and a stand 30 supporting the display unit 20; and capable of being mounted on a wall by changing the direction of the stand relative to the display unit 20 and fastening the stand 30 to a wall;

wherein the stand 30 includes a base 32 and a post 31 extending from the base 32 substantially perpendicularly to the base 32; the base 32 is provided with base's through holes (first through holes) 33 to be used for fastening the base 32 to a wall; the post 31 is provided with post's through holes (second through holes) 31a1 to be used for fastening the post 31 to the display unit 20; the display unit 20 has a fixing part 24 to be fixed to the post 31 at a position near its bottom part, is provided with a depressed part 25 formed at a predetermined position in its back wall 21 and provided with threaded holes 25a2 to be used for fastening the post 31 to the display unit 20.

The present invention provides a display 10 capable of being mounted on a wall by changing the direction of a stand 30 supporting a display unit 20 relative to the display unit 20, and fastening the stand 30 to a wall.

The stand 30 has a base 32, and a post 31 extending from the base 32 substantially perpendicularly to the base 32, the base 32 is provided with first through holes 33 for receiving third screws 60 for fastening the base 32 to a wall, and the post 31 is provided with second through holes 31a1 for receiving first screws 50 or second screws 40 for fastening the display unit 20 to the post 31. The display unit 20 is provided with a fixing part 24 to be fastened to the post 31 in a part near its bottom wall and with a depressed part 25 formed at a predetermined position in its back wall 21 and having a surface 25a provided with threaded holes 25a2 in which second screws 40 for fastening the display unit 20 to the post 31 are screwed.

The display 10 according to the present invention can be set in a normal position for use by fastening the post 31 of the stand 30 to the mounting part of the display unit 20 and setting the stand 30 at a desired place, such as a desk or a floor with the display unit 20 supported in an upright position on the stand 30. The display unit 20 can be mounted on a wall by fastening the post 31 of the stand 30 to the depressed part 24 of the display unit 20 with screws, and fastening the base 32 of the stand 30 to a desired wall with screws. Since the stand 30 originally included in the display 10 is used for mounting the display 10 on a wall, any additional mounting structure and a mounting fixture are not necessary. The post 31 of the stand 30 is fastened to the depressed part 25 of the back wall 21 of the display 10 to mount the display unit 20 on a wall W. Therefore, the display unit 20 can be held at a shorter distance from the wall W and hence the display unit 20 can be securely supported in the air.

Another optional aspect of the present invention provides the display 10 wherein the post 31 is fastened to the fixing part 24 by engaging a first screw 50 passed through the second through hole 31a1 with the fixing part 24;

the depressed part 25 has at least a down-facing surface 25a formed the threaded hole 25a2; and the post 31 is fastened to the depressed part 25 by engaging a second screw 40 passed through the second through hole 31a1 with the threaded hole 25a2.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A display capable of being mounted on a wall, the display comprising:

a display unit formed by housing a display panel in a case;

a stand supporting the display unit;

the stand having a base having a substantially elliptic outline, and a post extending from a substantially central part of the base substantially perpendicularly to the base;

the post having a flat part substantially parallel to the display panel, and rails formed by bending opposite side edge parts substantially perpendicularly to the flat part;

the stand formed by covering a sheet metal core member for the base and the post with a resin covering member;

a lower part of the display unit provided with a fixing part to which the post inserted into the case is fastened;

the fixing part having a part facing the flat part of the post inserted into the case and capable of engaging with first screws;

the flat part of the post is provided plural post's through holes through which the first screws are passed and engaged with the fixing part to fasten the flat part to the display unit;

the stand supports the display unit with the post fastened to the fixing part extending upward;

the case having a back wall comprising a depressed part with a vertical center axis aligned with a vertical line passing a substantially central part of the back wall, and opening backward and downward;

the depressed part having at least a down-facing surface provided with grooves in which the rails engage, for guiding the post into a depth of the depressed part;

the down-facing surface of the depressed part is provided with internally threaded bosses formed at positions respectively coinciding with the post's through holes and capable of engaging with second screws passed through the post's through holes;

the base of the stand is provided with plural base's through holes through which third screws are passed to fasten the base to the wall;

the stand supporting the display unit with the base and the post fastened to the wall and the depressed part, respectively; and the base having an outline within a region surrounded by an outline of the back wall of the display unit.

2. A display capable of being mounted on a wall, the display comprising:

a display unit;

a stand supporting the display unit;

the stand including a base and a post extending from the base;

a lower part of the display unit having a fixing part for fastening the post to the lower part;

the stand supporting the display unit with the post fastened to the fixing part extending upward;

the base of the stand is provided with a first through hole used for fastening the base to the wall;

the post of the stand is provided with a second through hole used for fastening the post to the display unit;

a back wall of the display unit includes a depressed part;

the depressed part is provided with a threaded hole used for fastening the post to the display unit;

the stand supporting the display unit with the base fastened to the wall and the post fastened to the depressed part; and wherein the post is fastened to the fixing part by engaging a first screw passed through the second through hole with the fixing part;

the depressed part has at least a down-facing surface formed with the threaded hole; and the post is fastened to the depressed part by engaging a second screw passed through the second through hole with the threaded hole.

3. The display according to claim 2, wherein a number of the first through holes formed in the base on a rear side of the display unit is greater than a number of the first through holes formed in the base on a front side of the display unit with the fixing part of the display unit fastened to the post.

4. The display according to claim 2, wherein the first through hole is formed at positions under a bottom wall of the display unit at least in a range on the front side of the display unit when the post is fastened to the fixing part.

5. The display according to claim 2, wherein the stand includes a sheet metal core member and serving as cores of the base and the post, and a covering member covering the sheet metal core member, and the first through hole is formed only in the sheet metal core member.

6. The display according to claim 2, wherein the post has a flat part provided with the second through hole, and rail formed by bending opposite side parts of the flat part substantially perpendicularly to the flat part; and the depressed part is provided with grooves, in which the rail engages, formed in a surface of the back wall provided with a threaded hole to guide the post into a depth of the depressed part.

7. The display according to claim 2, wherein the base has an outline within a region surrounded by the outline of the back wall of the display unit in a state where the post is fastened to the depressed part.

* * * * *